Oct. 7, 1924.
W. H. ROSE
FILTER
Filed Dec. 23, 1920    2 Sheets—Sheet 1
1,510,863
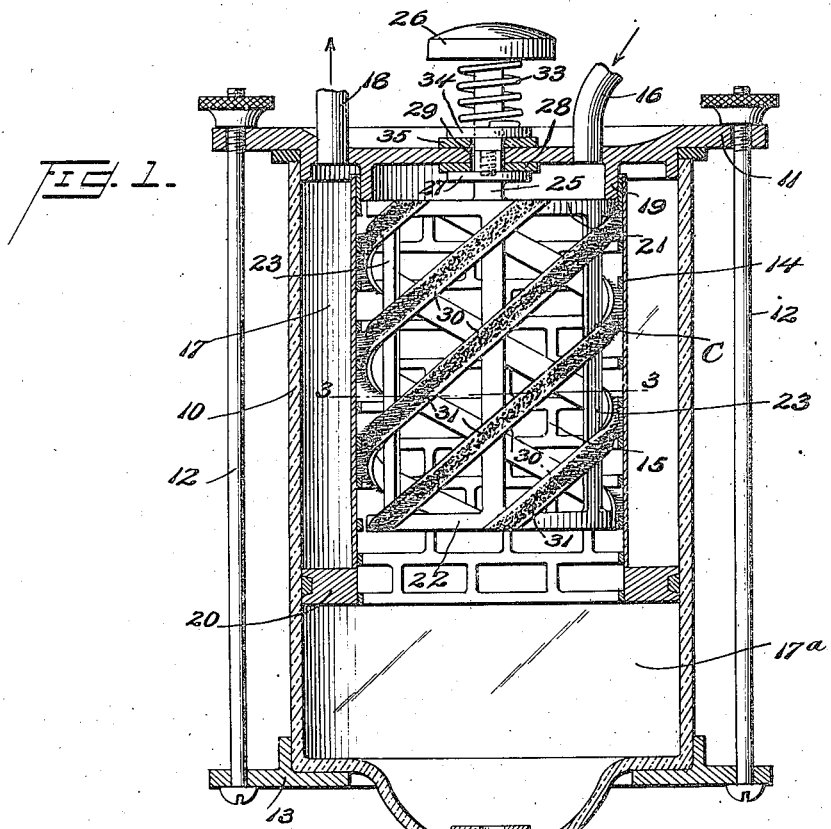
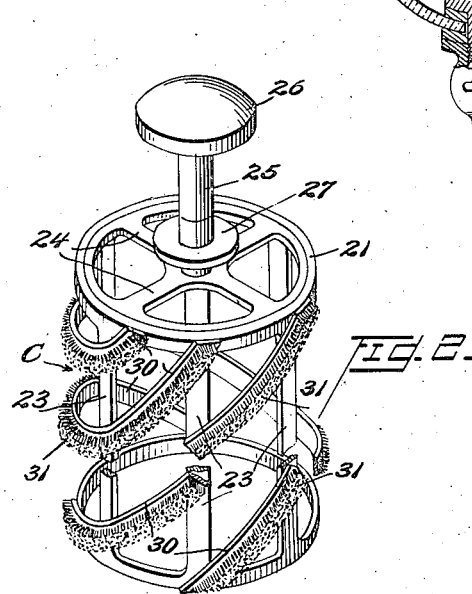
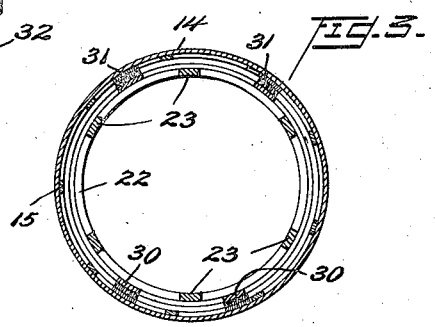
Inventor
William H. Rose,
By Watson, Coit, Morse & Grindle,
Att'ys

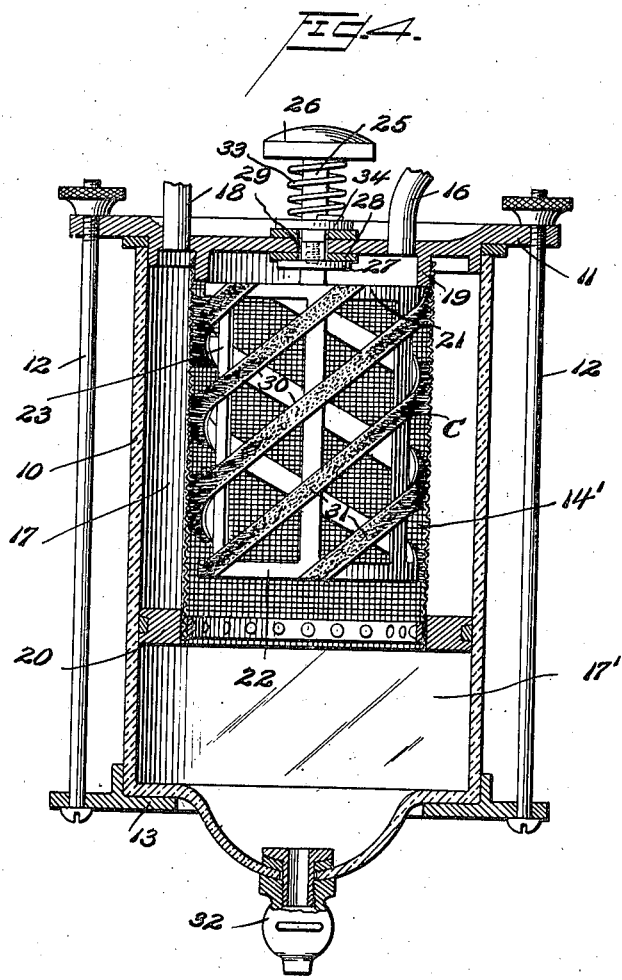

Patented Oct. 7, 1924.

1,510,863

UNITED STATES PATENT OFFICE.

WILLIAM H. ROSE, OF JERSEY CITY, NEW JERSEY.

FILTER.

Application filed December 23, 1920. Serial No. 432,791.

*To all whom it may concern:*

Be it known that I, WILLIAM H. ROSE, a citizen of the United States, and residing at Jersey City, Hudson County, State of New Jersey, have invented certain new and useful Improvements in Filters, of which the following is a specification.

This invention relates to filtering devices and particularly to filters adapted to be installed on automobiles for the purpose of removing from the gasoline passing from the storage tank to the engine such solid matter as may be present, to prevent the carbureter and vacuum feed tank from becoming obstructed by such matter.

An object of the invention is to provide an efficient device of this character which may be made of small size and another object is to provide a filter which has a special cleaning device for removing the impurities collected, from the surface of the filtering medium, this device being formed in a novel manner and arranged to perform its cleaning functions with a minimum of exertion by the operator.

The invention may be embodied in different forms, one of which is disclosed in the following description when taken with the accompanying drawings in which:

Figure 1 is a vertical longitudinal section through the filter, showing the filtering surface and cleaning device adjacent thereto;

Figure 2 is a perspective view of the cleaning device;

Figure 3 is a section on the line 3—3 of Figure 1, and

Figure 4 is a section through a filter made in accordance with the invention having a filtering medium of wire of close mesh.

The filter comprises essentially a container 10 which is preferably of glass so that the operator may observe the interior parts of the filter to ascertain if they are in proper working condition, a head 11 removably secured by means of bolts 12 to an annular member 13 underneath the container, the filtering medium 14 stretched tightly over the perforated supporting frame 15, and the cleaning device indicated generally at C. The frame 15 is cylindrical in shape and is preferably stamped from sheet metal, the large perforations therein permitting the gasoline which flows in through pipe 16, to reach the filtering medium, which is preferably chamois and to pass through the same into the outer annular chamber 17, leaving the dirt and impurities on the inside of the filtering cloth, and thence passing to the vacuum tank or carbureter through an outlet pipe 18. The upper end of the cylindrical frame 15 is secured to an annular flange 19 depending from the head 11 and its lower end is held in spaced relation to the cylindrical wall of the container by an annular partition 20 which makes a fluid-tight wall between the large chamber 17ª which is the dirt collecting chamber, and the annular chamber 17 in which the filtered liquid accumulates prior to passing out through the pipe 18.

The cleaning device consists of a cylindrical frame comprising an upper ring 21, a lower ring 22, a plurality of vertical ribs 23 rigidly connecting these rings and holding them in spaced relation and spokes 24 in the upper ring forming a spider, to the center of which is secured the shank 25 having an operating handle 26 secured to its upper end. This shank 25 has a flange 27 near its lower end which serves as a stop, abutting against the packing 28 on the underside of the head 11 and surrounding the central aperture 29 therein, and is formed in two parts joined together above the flange, these parts having threaded connection with each other so that the operating handle may be detached from the main portion of the frame.

Spirally wound around the frame and supported upon its ribs are a plurality of strips 30 each carrying a brush 31, the bristles of which extend laterally and engage the inner wall of the filtering medium, as shown clearly in Figure 1. The length of the cleaning device is only slightly shorter than the length of the filter and by moving the cleaner by means of the handle 26 is either a longitudinal direction or by rotating it the several brushes will quickly remove from the inner surface of the filter cloth any dirt which may have collected thereon and this dirt will fall to the bottom of the container where it will collect in the bowl-shaped center portion from where it may be from time to time removed by opening the valve 32.

A coiled spring 33 which abuts against the underside of the operating knob 26 and the washer 34 resting upon the packing 35, normally maintains the cleaning device at the top of the filter and by pressing downward upon the handle 26 with the fingers the filter may be caused to move downwardly relatively to the filter cloth and to effect the cleaning thereof. As before explained the cleaning device may not only be reciprocated but may also be rotated, or in fact it may be given a combined reciprocating and rotating movement. The cleaning device being almost as long as the filter surface needs only a short reciprocation to accomplish this purpose. This is a marked advantage of the present invention over prior devices utilizing reciprocating cleaning brushes, such prior devices requiring the reciprocation of a rod to a considerable distance, due to the fact that the cleaning brushes are of relatively short length as compared with the filtering surface. In automobiles it is particularly advantageous to have the cleaning movement effected in the manner described above, that is, with a short movement of the operating handle. The invention may be modified, if desired, as it is not limited in scope to the exact embodiment disclosed, for instance a different filtering medium may be used, such as a wire screen having very close mesh. In Figure 4 a filter having a wire screen filtering medium 14' is illustrated and in this form no frame is needed to support the filtering medium, which has ample strength to retain its shape. Also another form of cleaning device may be employed, the invention not being limited to the use of brushes.

Having thus described the invention what I claim as new and desire to secure by Letters Patent is:

1. In a filter, in combination, a casing, a cylindrical filtering surface in said casing, a cylindrical cleaning device in said casing and concentric with said filtering surface, said device being movable longitudinally relatively to said filter surface and rotatable relatively thereto and having a plurality of spaced inclined cleaning surfaces thereon in contact with said filtering surface.

2. In a filter, in combination, a filtering surface in said casing, a cleaning device also located in said casing and having a plurality of spaced inclined cleaning surfaces thereon in contact with the filtering surface and each at least equal in length to the width of said filtering surface, said device being manually movable in either of two directions at right angles, for the purpose set forth.

3. In a filter, in combination, a filtering surface in said casing, a cleaning device also located in said casing and movable in two directions relatively to the filter, said device having a plurality of elongated cleaning members thereon in constant contact with the filtering surface, the said members being inclined to both directions of movement of the cleaning device, for the purpose set forth.

In testimony whereof I affix my signature

WILLIAM H. ROSE